(12) United States Patent
Goto

(10) Patent No.: US 7,849,519 B2
(45) Date of Patent: Dec. 14, 2010

(54) AIR BAG SYSTEM FOR VEHICLE

(75) Inventor: Hiroshi Goto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/347,212

(22) Filed: Feb. 6, 2006

(65) Prior Publication Data

US 2006/0175810 A1    Aug. 10, 2006

(30) Foreign Application Priority Data

Feb. 9, 2005    (JP)  ............... 2005-033255

(51) Int. Cl.
    *A41D 3/02*    (2006.01)
(52) U.S. Cl. ......................... 2/96; 2/DIG. 3
(58) Field of Classification Search ...... 2/463, 2/465, 102, 108, 468, 92, 462, DIG. 3, 69.5, 2/96; 441/87, 88, 102, 106, 108
See application file for complete search history.

(56) References Cited

U.S. PATENT DOCUMENTS

| | | | |
|---|---|---|---|
| 4,453,271 A * | 6/1984 | Donzis ........................ | 2/456 |
| 4,455,685 A * | 6/1984 | Steffler et al. ............... | 2/2.11 |
| 5,127,106 A * | 7/1992 | Aldridge ..................... | 2/81 |
| 5,153,938 A * | 10/1992 | Epperson ..................... | 2/2.14 |
| 5,318,018 A * | 6/1994 | Puma et al. ............ | 128/202.11 |
| 5,816,613 A | 10/1998 | Specht et al. | |
| 6,230,333 B1 * | 5/2001 | Umeda ......................... | 2/463 |
| 6,298,487 B1 * | 10/2001 | Mayhew ........................ | 2/108 |

FOREIGN PATENT DOCUMENTS

| | | |
|---|---|---|
| DE | 29611869 U1 | 12/1996 |
| DE | 19730397 C1 | 10/1998 |
| EP | 0891901 A1 | 1/1999 |
| EP | 0925730 A2 | 6/1999 |
| FR | 2680146 A1 | 2/1993 |
| GB | 2345031 A | 6/2000 |
| JP | 57-501867 T | 10/1982 |
| JP | 3048094 A | 3/1991 |
| JP | 9-66789 A | 3/1997 |
| JP | 2001-502383 T | 2/2001 |
| WO | WO-82/01464 A1 | 5/1982 |
| WO | WO-98/11793 A1 | 3/1998 |
| WO | WO-2005/048754 A1 | 6/2005 |

OTHER PUBLICATIONS www.bast.de, Motorrad fahren mit Sicherheit, Sichereitsinfo Nr. 5, Aug. 2005.

* cited by examiner

*Primary Examiner*—Tejash Patel
(74) *Attorney, Agent, or Firm*—Birch, Stewart, Kolasch & Birch, LLP

(57) ABSTRACT

To make it easy for a rider to put on protective clothing provided with air bags and to effectively absorb an impact on the rider using the air bags. A wearable air bag system is provided wherein the rider puts on the protective clothing beforehand. An air bag for covering a chest portion of a rider in an undivided manner is provided on the back surface of a front main section of a jacket worn by the rider. The jacket has opening edges capable of being opened and closed by a fastener. The opening edges are provided on the front main section of the jacket to be closer to one sleeve of the jacket in such a manner that the air bag is avoided.

19 Claims, 7 Drawing Sheets

FIG. 5   AIR BAG-ACTIVATED CONDITION

AIR BAG SYSTEM FOR VEHICLE

CROSS-REFERENCE TO RELATED APPLICATIONS

The present application claims priority under 35 USC 119 to Japanese Patent Application No. 2005-033255 filed on Feb. 9, 2005 the entire contents of which are hereby incorporated by reference.

FIELD OF THE INVENTION

The present invention relates to an air bag system which is suitable for a vehicle, particularly for a two-wheeled motor vehicle. More specifically, to an air bag system a rider puts on the air bag system on his or her body to absorb an impact on the rider.

DESCRIPTION OF BACKGROUND ART

Conventionally, for vehicles, particularly for two-wheeled motor vehicles, wearable air bag systems are publicly known, see, for example, Japanese Patent Application Laid-open Publication No. Hei 9-66789. In such a wearable air bag system, an air bag module including an air bag and an inflator is provided on a clothing article worn by a rider. When a two-wheeled motor vehicle has a collision, the inflator is actuated, and the air bag is expanded and deployed to absorb an impact on the rider.

In addition, in such a wearable air bag system, it is desirable that the clothing article provided with the air bag is easy to be worn by the rider and that the impact on the rider is effectively cushioned. A conceivable means for satisfying such demands is as follows:

The rider can easily put on a clothing article, such as a normal jacket, provided with an air bag without hesitation.

(2) The air bag can evenly cover at least the entire chest portion of the rider.

However, as shown in FIG. 7, a clothing article, such as the jacket, which is easy to put on, generally has opening edges at the central portion of the front thereof so that the clothing article is opened at the front to be separated into left and right portions. The opening edges can generally be opened and closed by a fastener such as a slide fastener, buttons, or a hook-and-loop fastener. Accordingly, to provide an air bag on a front main section of this clothing article so that a chest portion of the rider is covered, the air bag must be provided to be divided into left and right portions on both sides of the central portion of the front main section of the clothing article in such a manner that the fastener is avoided. Thus, there is the problem that it is difficult to evenly cover the entire chest portion of the rider.

SUMMARY AND OBJECTS OF THE INVENTION

The present invention has been accomplished in view of the above-described circumstances. An object of an embodiment of the present invention is to provide a new vehicular air bag system in which the above-described problem is solved.

In order to achieve the above-described object according to an embodiment of the present invention, a vehicular air bag system is provided wherein a rider puts on the air bag system on his or her body to absorb an impact on the rider. The vehicular air bag system includes at least one air bag for covering at least a chest portion of the rider in an undivided manner and which is provided on a back surface of a front main section of a clothing article worn by the rider. The clothing article has opening edges capable of being opened and closed by a fastener. The opening edges are provided on the front main section to be closer to any one of left and right sleeves of the clothing article in such a manner that the air bag is avoided.

Further, according to an embodiment of the present invention the vehicular air bag system provides a hard protector on the air bag so that an impact force acting on the air bag can be dispersed by the hard protector.

Moreover, according to an embodiment of the present invention the clothing article can be stretched and contracted so as to follow the expansion and deployment of the air bag.

Furthermore, according to an embodiment of the present invention the air bag includes a front air bag for covering the chest portion of the rider in an undivided manner and a rear air bag for covering a back portion of the rider. Both front and rear air bags are expanded and deployed by gas generated by a common inflator.

According to an embodiment of the present invention, the rider can easily put on the clothing article provided with the air bag. In addition, an impact on the rider can be effectively cushioned by the air bag.

Further, according to an embodiment of the present invention, an impact force acting on the air bag can be dispersed by the hard protector. Thus, a function of the air bag which cushions an impact on the rider becomes more prominent.

Moreover, according to an embodiment of the present invention, the clothing article does not interfere with free expansion and deployment of the air bag.

Furthermore, according to an embodiment of the present invention, impacts on the chest and back portions of the rider can be effectively cushioned.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, embodiments of the present invention will be specifically described based on examples of the present invention with reference to FIGS. 1 to 5.

First, with reference to FIGS. 1 to 5, a first example of the present invention will be described, wherein an air bag system of the present invention is applied to a two-wheeled motor vehicle.

Figure 1:
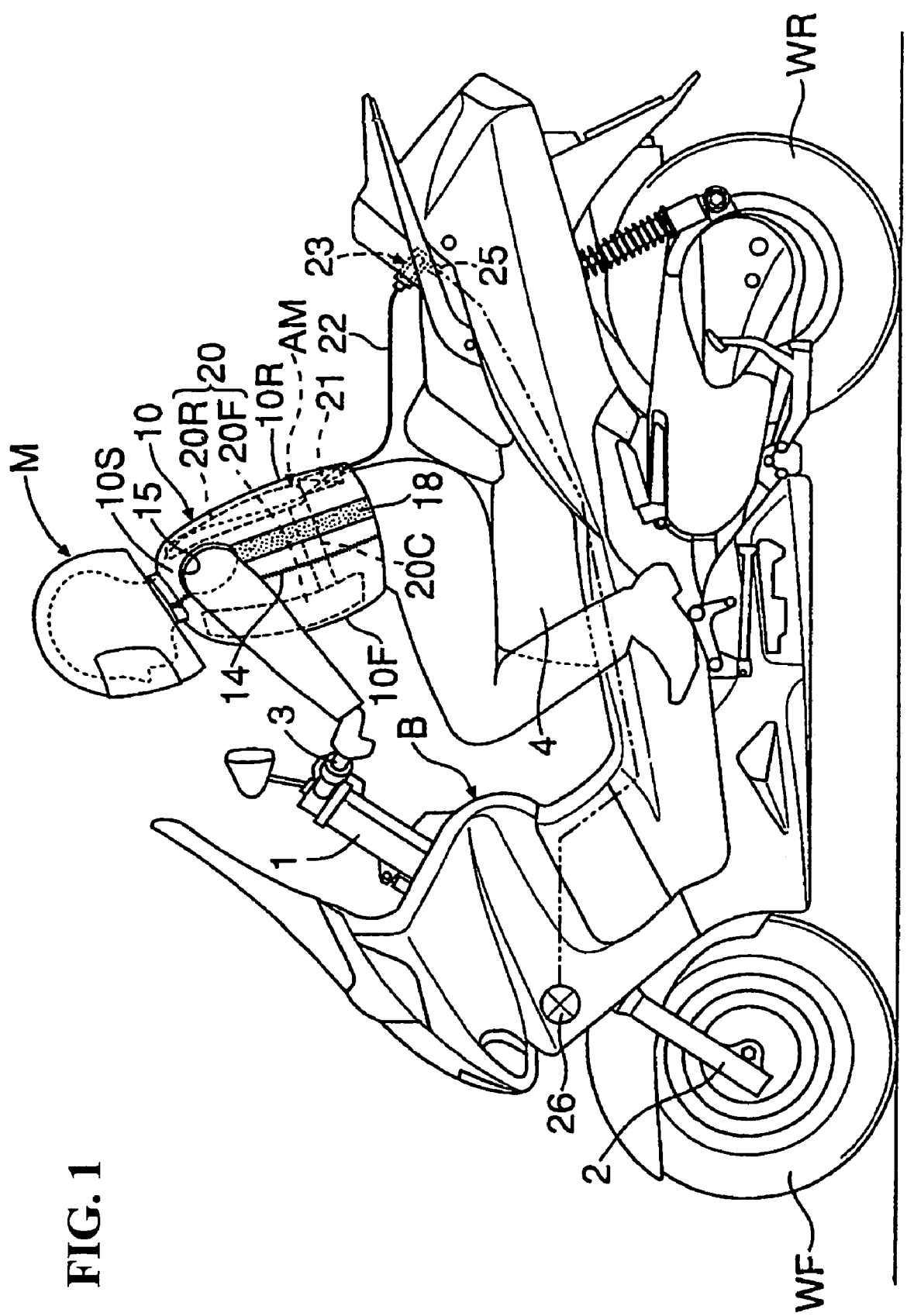
FIG. 1 is a side view of a two-wheeled motor vehicle provided with an air bag system for a vehicle.

In FIG. 1, a front fork 2 to which a front wheel WF is rotatably attached is supported by a head pipe 1 at the front end of a vehicle body B of the two-wheeled motor vehicle so as to allow steering with a steering handle 3 being provided at a top portion of this front fork 2. Further, a rear wheel WR, which is driven by an engine (not shown) supported by the vehicle body B, is suspended in a rear portion of the vehicle body B. On the top surface of a rear half portion of the vehicle body B, a tandem seat 4 for two riders is provided. A rider M wearing a clothing article, e.g., a jacket 10 (described later in detail), sits on the tandem seat 4.

Figure 2:
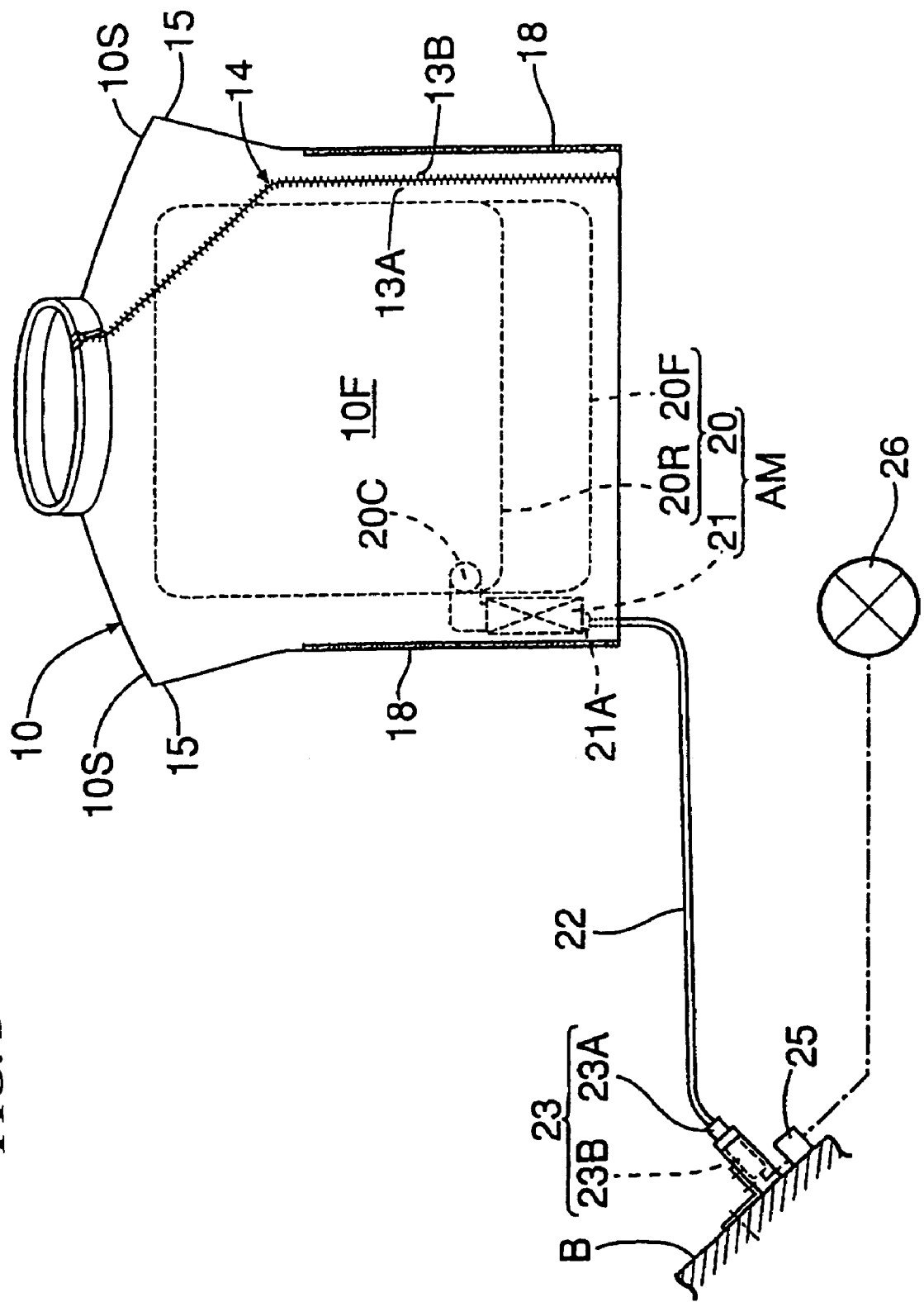
FIG. 2 is a general view of the air bag system.

As illustrated in FIGS. 1 and 2, an air bag module AM is provided on the jacket 10. This air bag module AM includes an inflator 21 for generating high-pressure gas at the time of activation, and air bags 20 which are expanded and deployed by the gas generated by the inflator 21 to cushion an impact on the rider M. A control cord 22 is connected to a working portion 21A of the inflator 21. This control cord 22 extends towards the rear portion of the vehicle body B, and the free end of the control cord 22 is connected to one coupler 23A of a detachable starting switch 23 provided at an appropriate position in the rear portion of the vehicle body B. The starting switch 23 includes a pair of detachable couplers 23A and 23B. When the coupling between the couplers 23A and 23B is released, the starting switch 23 detects the release to actuate the inflator 21.

Moreover, in the rear portion of the vehicle body B of the two-wheeled motor vehicle, an electronic control unit 25 is provided close to the starting switch 23. Further, in a front portion of the vehicle body B, an impact sensor 26 is provided for detecting an impact force acting on the vehicle and for transmitting a detection signal according to the magnitude of the impact force to the electronic control unit 25. The electronic control unit 25 is configured for issuing an output signal when receiving the detection signal from the impact sensor 26 and for determining that the impact force is excessive. An output signal line extending from the electronic control unit 25 is connected to the detachable starting switch 23.

Figure 3:
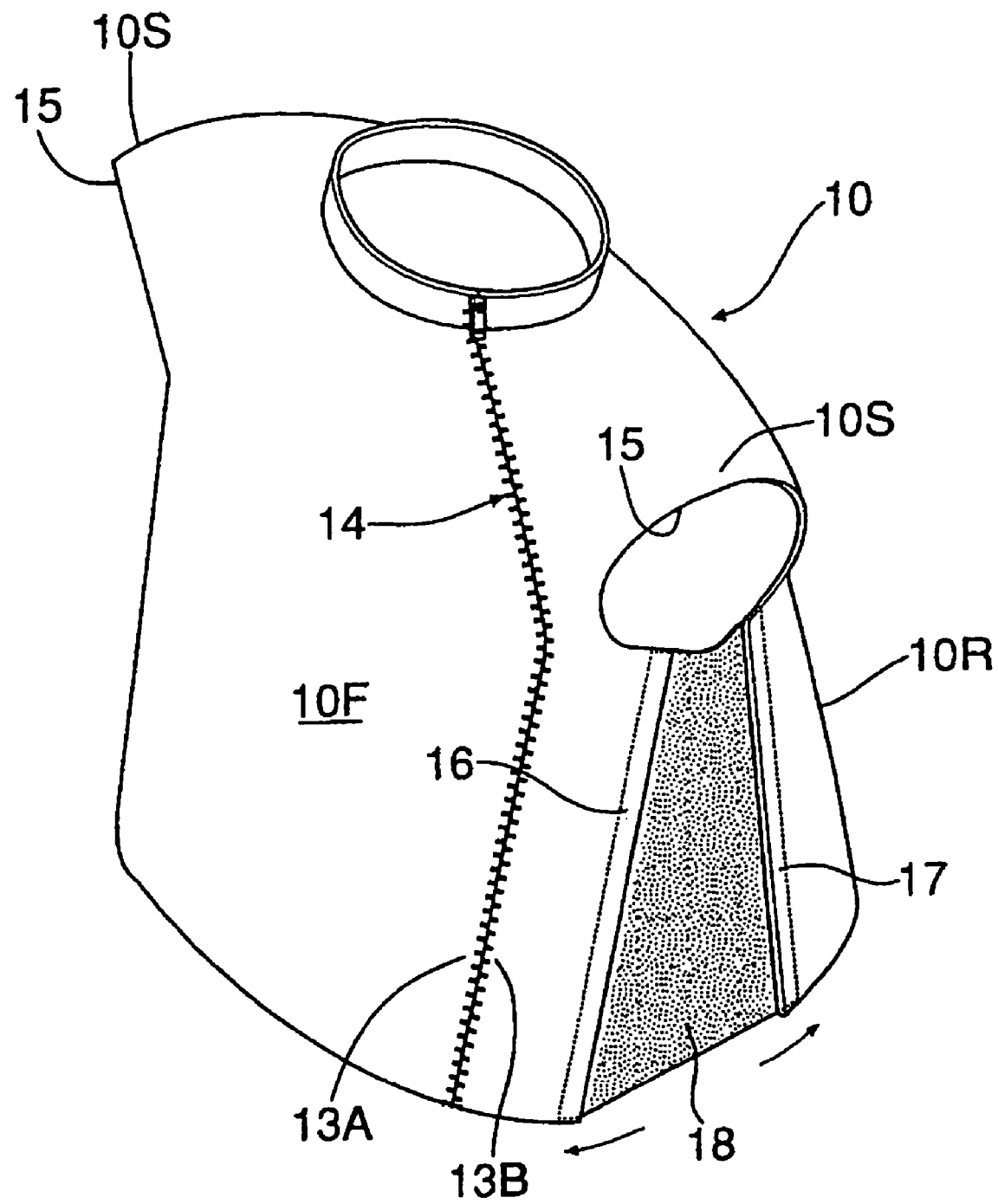
FIG. 3 is a perspective view of a jacket provided with air bags.
Figure 4:
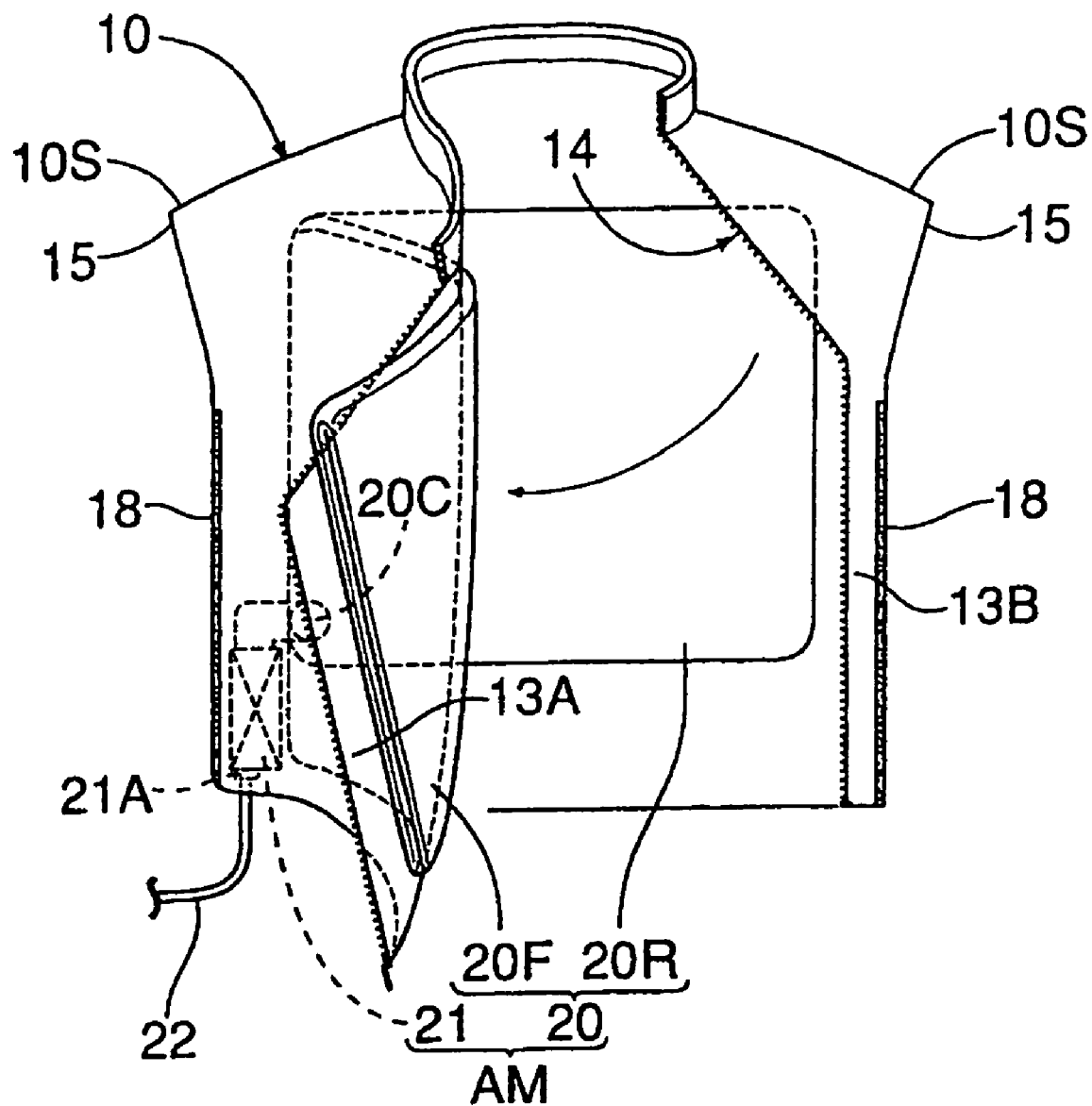
FIG. 4 is a front view of the jacket in a state of being opened at the front thereof.

As shown in FIGS. 3 and 4, the jacket 10 worn by the rider M has opening edges 13A and 13B closer to one sleeve 10S (left sleeve of the rider) with respect to the center portion of a front main section 10F of the jacket 10 so that the front main section 10F is opened at the front. These opening edges 13A and 13B are designed to be opened and closed by a slide fastener or zipper 14.

It should be noted that a hook-and-loop fastener (such as Velcro a trademarked fastener), buttons, or the like may be used instead of the slide fastener or zipper 14.

The air bags 20 are attached to the backside of the jacket 10. The air bags 20 include a front air bag 20F and a rear air bag 20R. As shown in FIGS. 2 and 4, the front air bag 20F is provided on, and integrated with, almost the entire back surface of the front main section 10F of the jacket 10 in such a manner that the opening edges 13A and 13B are avoided. Thus, an equal covering is provided of almost the entire chest portion of the wearer M. Further, the rear air bag 20R is also provided on, and integrated with, the back surface of a rear main section 10R of the jacket 10 so as to cover the back portion of the wearer M. The front and rear air bags 20F and 20R are allowed to communicate with each other through a communicating path 20C, and are therefore expanded and deployed by high-pressure gas from the inflator 21 at almost the same time.

As illustrated in FIGS. 3 and 4, the jacket 10 is divided into front and rear portions from left and right cuffs 15 to the lower edge thereof. Division edges 16 and 17 between the front and rear portions are connected using stretch cloth 18. This stretch cloth 18 is generally under tension in the direction in which the division edges 16 and 17 between the front and rear portions are brought closer to each other. When the air bags 20 extend and deploy, the stretch cloth 18 is stretched in the forward and backward directions so that the jacket 10 can follow the expansion and deployment of the air bags 20.

Next, the operations of this example will be described.

As shown in FIG. 1, the rider M first puts on the jacket 10 in which the air bag module AM including the air bags 20 and the inflator 21 has been provided and thereafter sits on the tandem seat 4 of the two-wheeled motor vehicle, and connects one coupler 23A at the free end of the control cord 22 extending from the working portion 21A of the inflator 21 to the other coupler 23B on the vehicle body B side. Thus, the inflator 21 is brought into a state of being connected to the impact sensor 26 through the starting switch 23 and the electronic control unit 25.

The rider M confirms the connection and then starts to drive the two-wheeled motor vehicle. Here, during normal driving of the two-wheeled motor vehicle, although the inflator 21 on the rider M side and the starting switch 23 on the vehicle body B side are connected through the control cord 22, the rider M can continue normal driving while freely moving his or her body with almost no awareness of the connection of the control cord 22 by appropriately relaxing the control cord 22.

Figure 5:
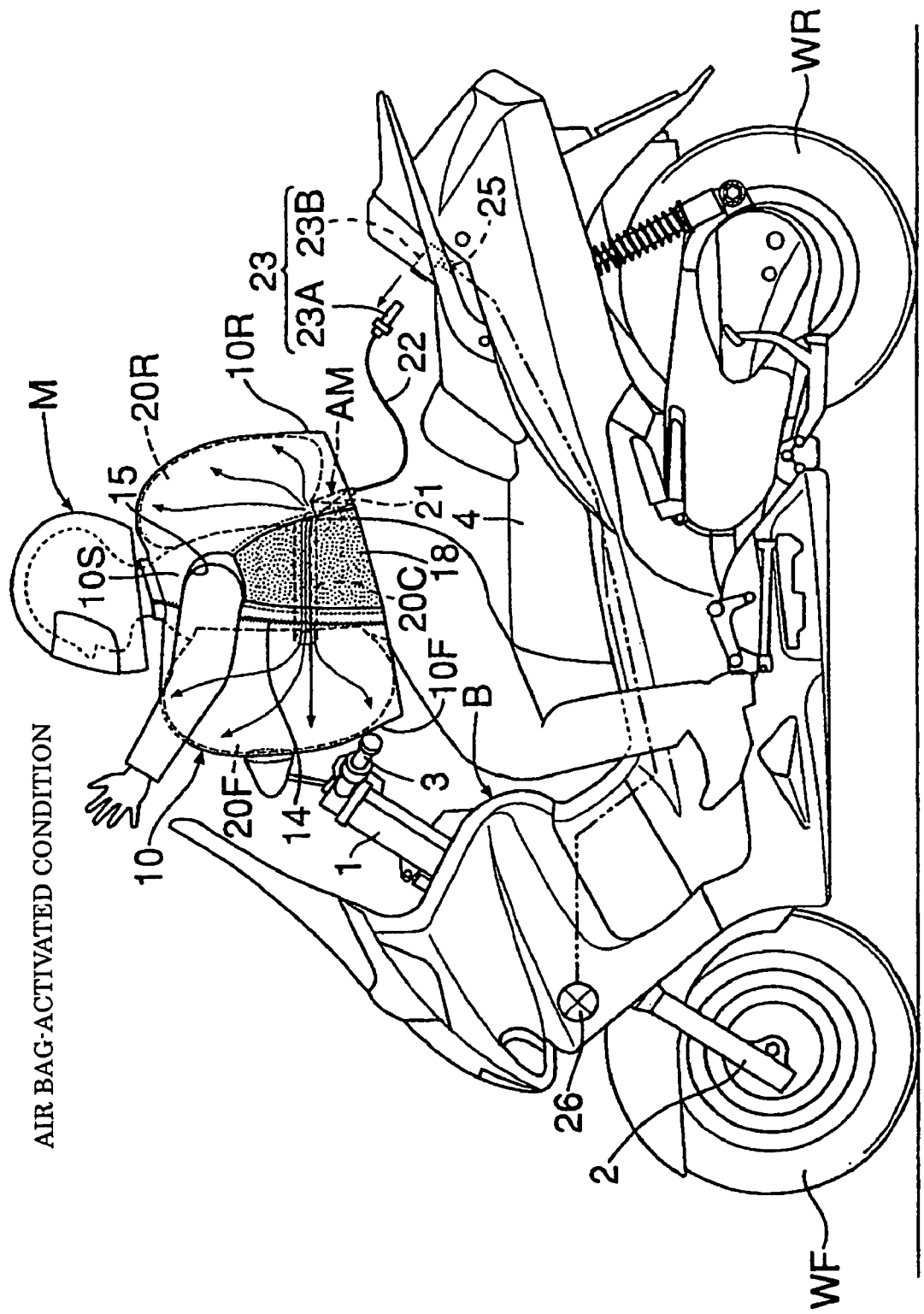
FIG. 5 is a side view of the two-wheeled motor vehicle in a state in which the air bag system is activated.

Further, when the two-wheeled motor vehicle has a collision with another vehicle, an obstacle, or the like, the impact sensor 26 detects an impact force and inputs a detection signal according to the magnitude of the impact force into the electronic control unit 25. The electronic control unit 25 determines whether the impact force is excessive or not. When the impact force has been determined to be excessive, an output signal of the electronic control unit 25 is inputted into the starting switch 23. Thus, as shown in FIG. 5, the coupling of the detachable starting switch 23 is forced to be released to actuate the inflator 21. Thus, an impact on the rider M due to the collision with the obstacle can be absorbed by expanding and deploying the air bags 20, and the rider M can move away from the vehicle body B.

In addition, the front air bag 20F of the air bags 20 covers almost the entire chest portion of the rider M in an undivided manner, and the rear air bag 20R thereof covers the back portion of the rider M. Accordingly, an impact on the rider M can be effectively cushioned. Further, the jacket 10 can stretch and contract in compliance with the expansion and deployment of the air bags 20, and does not interfere with desired expansion and deployment of the air bags 20.

Next, a second example of the present invention will be described.

Figure 6:
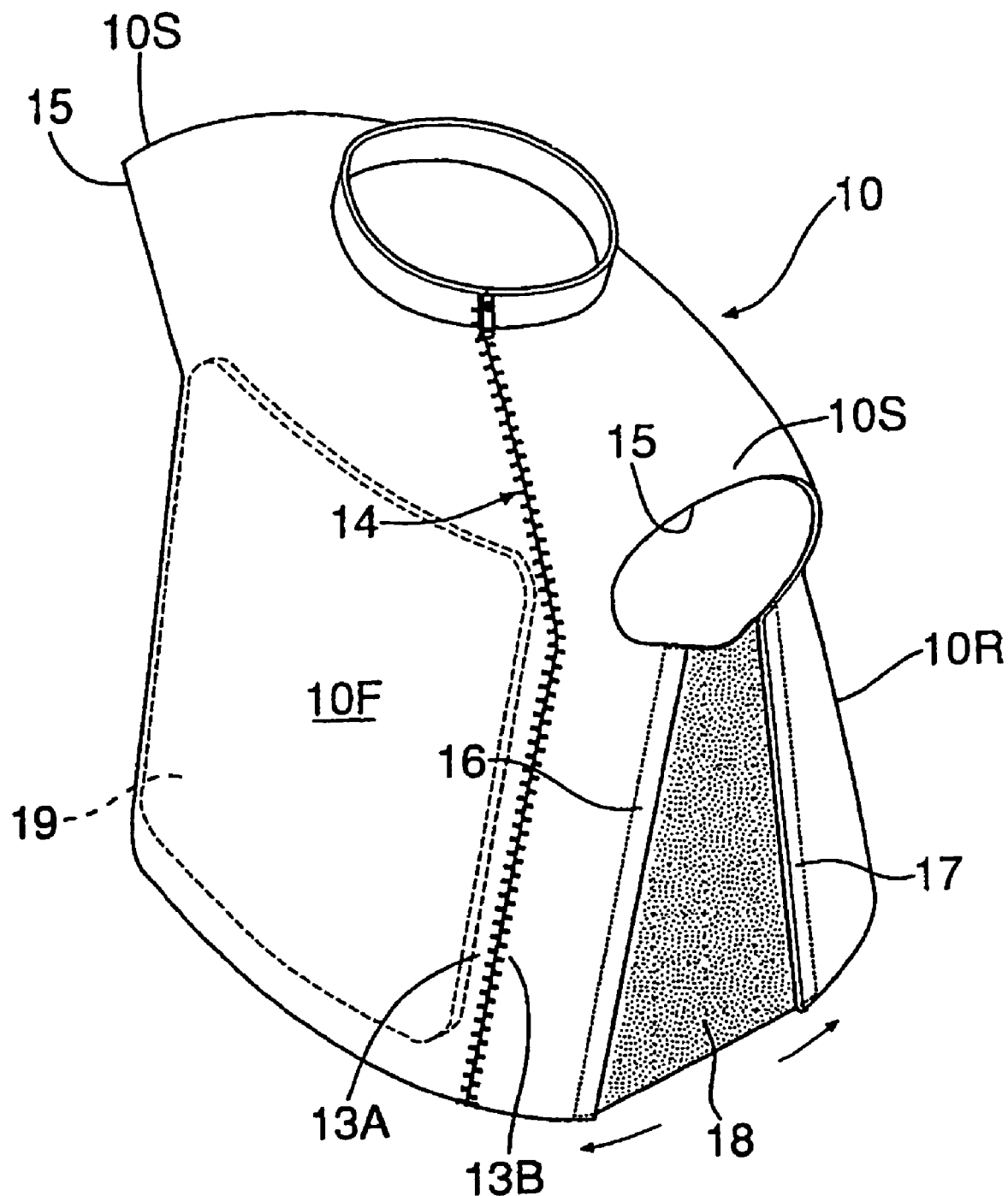
FIG. 6 is a perspective view of a second example of a jacket provided with air bags.
Figure 7:
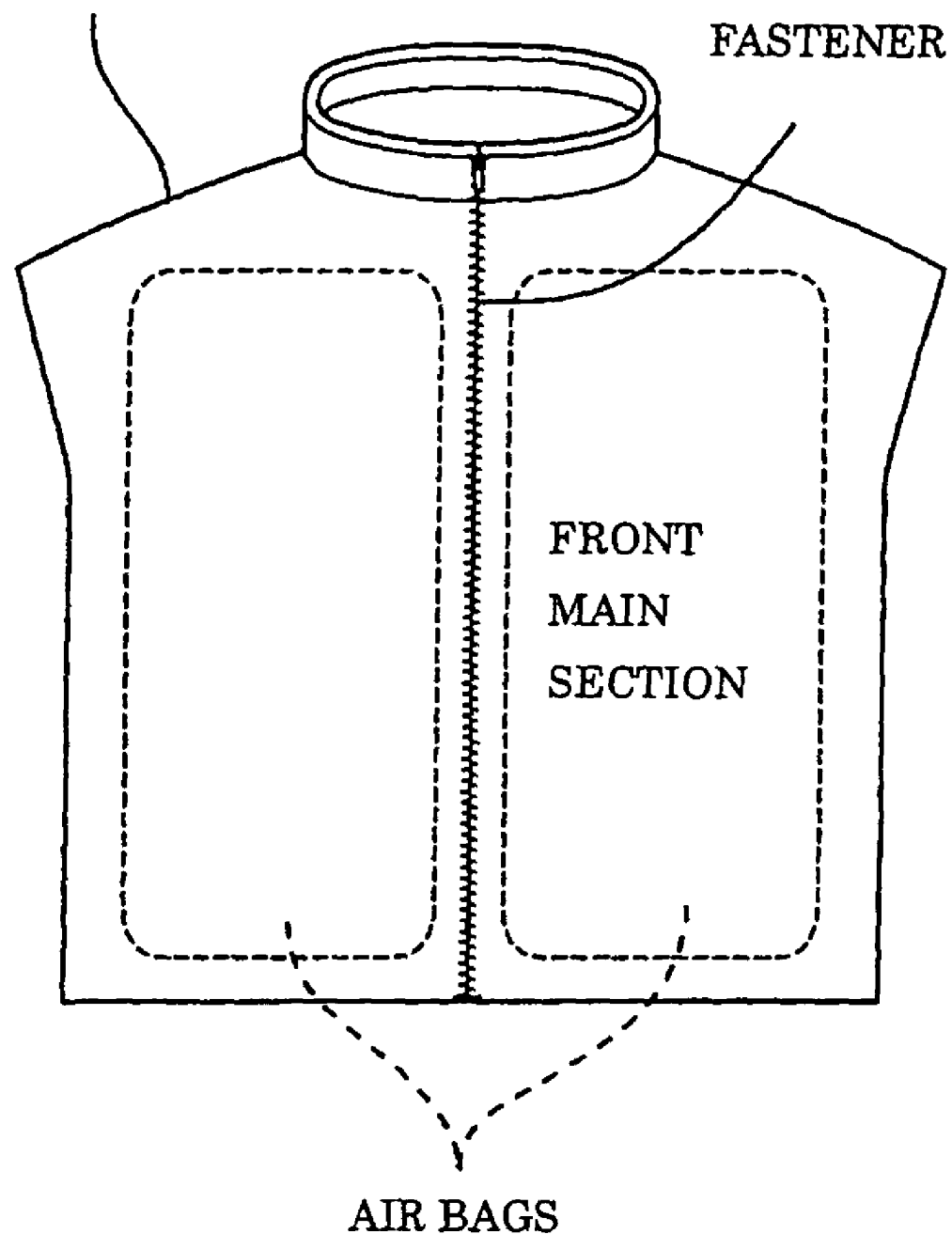
FIG. 7 is a front view of a jacket provided with air bags which is generally conceivable.

FIG. 6 is a perspective view of a jacket 10 according to the second example of the present invention. In FIG. 6, the same components as those of the aforementioned first example are denoted by the same reference numerals.

In this second example, a hard protector 19 is provided to be laid on the front surface of the front air bag 20F. This hard protector 19 faces the front main section 10F of the jacket 10. The hard protector 19 is formed of hard synthetic resin such as polypropylene or metal such as an aluminum alloy.

Thus, according to this second example, the hard protector 19 can propagate an impact force acting thereon to the front air bag 20F in a dispersed manner, and a function of the air bags 20 which absorbs an impact on the rider M becomes more prominent.

Although examples of the present invention have been described above, the present invention is not limited to the examples. Various examples can be carried out within the scope of the present invention.

For example, though a description has been given for the case where the present invention is applied to a two-wheeled motor vehicle in the aforementioned examples, it is a matter of course that the present invention can be applied to other vehicle such as a three-wheeled motor vehicle. Further, instead of the jacket, other substance having the same effect may be used as the clothing article.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular air bag system which a rider puts on beforehand on his or her body to absorb an impact on the rider, the vehicular air bag system comprising:
    a front air bag extending laterally across a central area of a chest portion of the rider in an undivided manner for covering the chest portion of the rider, the front air bag being provided on a back surface of a front main section of a clothing article worn by the rider;
    a rear air bag for covering a back portion of the rider; and
    a connecting path adjacent to an inflator, the connecting path extending between a lower portion of the rear air bag and a lower portion of the front air bag,
    wherein the clothing article has opening edges capable of being opened and closed by a fastener, the opening edges being provided on the front main section to be closer to any one of left and right sleeves of the clothing article in such a manner that the front and rear air bags are avoided,
    wherein a hard protector extending laterally across the chest portion of the rider is provided on the front air bag so that an impact force acting on the air bag can be dispersed by the hard protector.

2. The vehicular air bag system according to claim 1, wherein the clothing article includes a stretchable section under at least one sleeve of the clothing article, and the fastener extends upwardly from a lower edge of the clothing article between side edge of the front air bag and forward edge of a stretchable section.

3. The vehicular air bag system according to claim 2, wherein the clothing article can stretch and contract so as to follow expansion and deployment of the front and rear air bags.

4. The vehicle air bag system according to claim 2, wherein the inflator is a common inflator, and both of the front and rear air bags are expanded and deployed by gas generated by the common inflator.

5. The vehicular air bag system according to claim 1, wherein the clothing article can stretch and contract so as to follow expansion and deployment of the front and rear air bags.

6. The vehicle air bag system according to claim 5, wherein the inflator is a common inflator, and both of the front and rear air bags are expanded and deployed by gas generated by the common inflator.

7. The vehicle air bag system according to claim 1, wherein the inflator is a common inflator, and both of the front and rear air bags are expanded and deployed by gas generated by the common inflator.

8. The vehicular air bag system according to claim 7, wherein the common inflator is disposed below the rear air bag.

9. The vehicular air bag system according to claim 1, wherein the airbag covering at least the chest portion of the rider is substantially rectangular in shape.

10. The vehicular air bag system according to claim 1, wherein the inflator is disposed below the rear air bag.

11. A vehicular air bag system for use by a rider for absorbing impact on the rider, the vehicular air bag system comprising:
    a clothing article adapted to be worn by the rider, the clothing article having a front main section and a rear main section; and
    a rectangular shaped front air bag extending continuously from a left side to a right side of a chest portion of the rider in an undivided manner, the front air bag being adapted to cover at least substantially the chest portion of the rider, the front air bag being provided on a back surface of a front main section of the clothing article worn by the rider;
    a rear air bag for covering a back portion of the rider; and
    further comprising a connecting path adjacent to an inflator, the connecting path extending between a lower portion of the rear airbag and a lower portion of the front airbag, and
    a hard protector provided on the front air bag so that an impact force acting on the front air bag can be dispersed by the hard protector,
    wherein the clothing article has opening edges capable of being opened and closed by a fastener, the opening edges being provided on the front main section to be closer to either a left or a right sleeve of the clothing article in such a manner that the front and rear air bags and the hard protector are avoided by the fastener.

12. The vehicular air bag system according to claim 11, wherein the clothing article can stretch and contract so as to follow expansion and deployment of the front and rear air bags.

13. The vehicle air bag system according to claim 12, wherein the inflator is a common inflator, and both of the front and rear air bags are expanded and deployed by gas generated by the common inflator.

14. The vehicle air bag system according to claim 11, wherein the inflator is a common inflator, and both of the front and rear air bags are expanded and deployed by gas generated by the common inflator.

15. The vehicular air bag system according to claim 11, wherein the inflator is disposed below the rear air bag.

16. A vehicular air bag system for use by a rider for absorbing impact on the rider, the vehicular air bag system comprising:
    a clothing article adapted to be worn by the rider having a front air bag and a rear air bag; and the front air bag for covering at least a chest portion of the rider, the front air bag provided on a back surface of a front main section of the clothing article worn by the rider, wherein the clothing article includes:
- opening edges capable of being opened and closed by a fastener, the opening edges being provided on the front main section to be closer to either a left or a right sleeve of the clothing article in such a manner that the front air bag is undivided and is avoided by the fastener, and
- a stretchable section disposed on a side of the clothing article adapted to stretch and contract so as to follow expansion and deployment of the front air bag and the rear air bag, the stretchable section being disposed so as not to overlap either the front air bag or the rear air bag.

17. The vehicular air bag system according to claim 16, wherein the stretchable section includes left and right stretchable sections adapted to stretch and contract so as to follow expansion and deployment of the front and rear air bags, the stretchable sections being disposed so as to respectively connect the front main section and a rear main section on left and right sides of the clothing article.

18. The vehicle air bag system according to claim 17, wherein the inflator is a common inflator, and both of the front and rear air bags are expanded and deployed by gas generated by the common inflator.

19. The vehicular air bag system according to claim 16 wherein the front air bag covering at least the chest portion of the rider is substantially rectangular in shape.

* * * * *